March 24, 1959     G. P. CHRISTENSEN     2,878,673
MOUNTING MEANS FOR AN AUTO ANTENNA THERMOMETER
Filed April 10, 1956
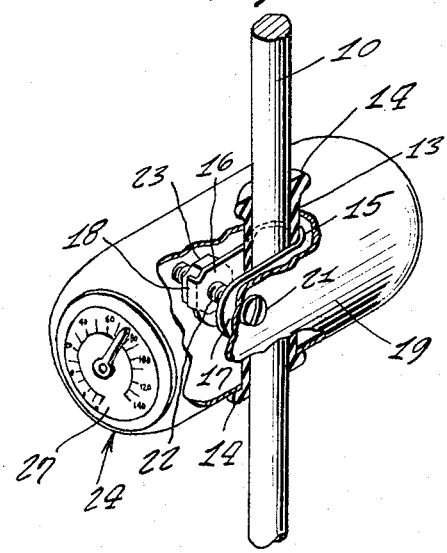
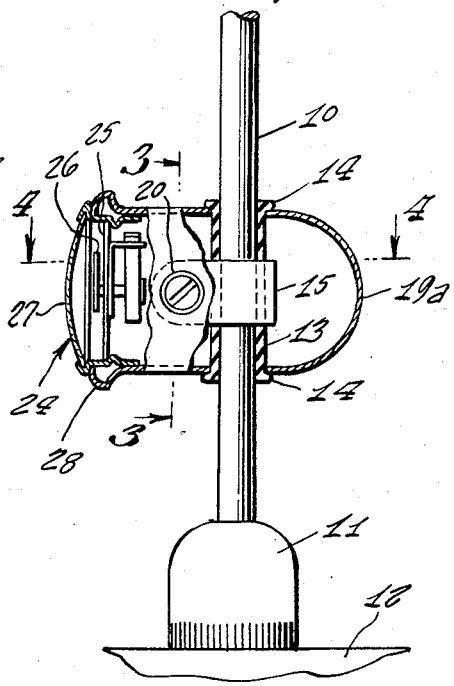
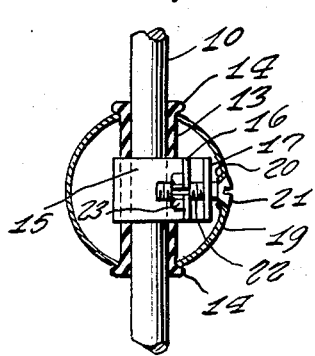
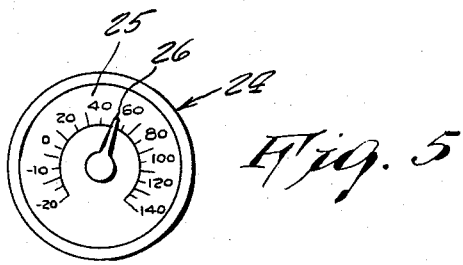
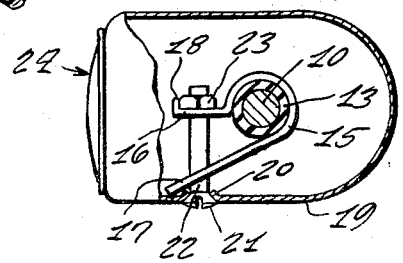
INVENTOR.
Grover P. Christensen

2,878,673

MOUNTING MEANS FOR AN AUTO ANTENNA THERMOMETER

Grover P. Christensen, McKeesport, Pa.

Application April 10, 1956, Serial No. 577,239

4 Claims. (Cl. 73—343)

This invention relates to thermometers.

It is an object of the present invention to provide a thermometer for vehicles which may be easily and readily mounted on any conventional automobile radio antenna at any desired height.

It is another object of the present invention to provide an auto antenna thermometer of the above type which comprises a thermometer contained in a streamlined housing which may be easily and readily attached to the antenna of any automobile.

Other objects of the invention are to provide an automobile antenna thermometer bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a perspective view shown partly broken away and in section of a preferred embodiment of the present invention shown in operative use;

Fig. 2 is a side elevational view thereof shown in part in section;

Fig. 3 is a vertical sectional view taken along the line 3—3 of Fig. 2;

Fig. 4 is a horizontal sectional view taken along the line 4—4 of Fig. 2; and

Fig. 5 is an end elevational view of the spring operated thermometer forming a part of the invention.

Referring now more in detail to the drawing, there is shown a conventional automobile radio antenna including the usual mast 10 and base 11 mounted on the fender 12, in a manner well known to those skilled in the art.

In the practice of my invention, a thermometer is provided which may be easily and readily attached to the mast 10 and which is mounted within a streamlined housing to reduce air resistance. This thermometer includes an elongated, hollow cylindrical rubber sleeve 13 integrally formed at its upper and lower ends with the peripheral flanges 14, the sleeve 13 being adapted to be press fitted onto and expanded onto the mast 10 in the manner shown.

A hollow cylindrical clamp 15 of sheet metal steel is positioned on the sleeve 13, the clamp 15 being open at one side and integrally formed with the tightening flanges 16 and 17 (Fig. 4). The flange 16 at the end thereof is integrally formed with the flange 18 at right angles thereto for a purpose which will hereinafter become clear.

A hollow bullet-shaped streamlined casing 19 is provided with vertically aligned circular openings which receive therethrough the sleeve 13 (Fig. 2), the casing 19 surrounding these openings being in engagement with the flanges 14 of the sleeve. The casing 19 at one side is provided with an inwardly stamped, frusto-conical opening 20 which receives therewithin a frusto-conical head 21 of the mounting screw 22 which passes through aligned openings in the flanges 16 and 17 and receives on the inner end thereof the nut 23, the rotational movement of which is prevented by abutment of one side with the flange 18. The flanges 16 and 17 are in the position shown in Figs. 3 and 4 where it is seen that flange 17 is in contact with the inner part of the casing 19 adjacent the opening 20.

The rear end of the casing 19 is open and mounts therewithin a spring operated thermometer indicated generally at 24 and including the dial 25 and the indicator 26 as well as the crystal 27. The operation of these spring operated thermometers is well known to those skilled in the art, and it will not, therefore, be described in further detail.

The casing 19 is preferably formed of sheet metal steel which is chromium plated on the outside. The head 21 of the screw 22 on the outer face thereof is similarly chromium plated.

In operation, it is only necessary to loosen the screw 22 to permit the free expansion of the clamp 15 and sleeve 13 and to press the sleeve downwardly onto the mast of the auto radio antenna 10 on the upper end thereof, adjusting the device vertically to the comfort of the motorist whereupon the screw 22 will be tightened by means of the slotted head 21 to permanently position the device. The rear end of the casing 19 may be streamlined, as shown in Figs. 1 and 4, or formed with the annular ridge 28 shown in Fig. 2 of casing 19a. The clamp 15 is preferably formed of sheet steel. The hemispherical front end of the casings 19, 19a will reduce air resistance, as will the cylindrical body portions thereof.

While various changes may be made in the detail construction, it shall be understood that such changes shall be within the spirit and scope of the present invention as defined by the appended claims.

What I claim as new and desire to protect by Letters Patent of the United States is:

1. Mounting means for an auto antenna thermometer having a hollow casing formed with vertically aligned apertures in the wall thereof adapted to receive therethrough a portion of an antenna, said mounting means comprising an elongated, hollow cylindrical rubber sleeve resiliently engaging said antenna portion and extending through said vertically aligned openings in said casing, said sleeve being formed at the ends thereof with integral annular flanges adapted to engage the portions of the casing wall surrounding said openings, and clamp means engaging said sleeve and connected to said casing.

2. Mounting means for an auto antenna thermometer according to claim 1, said clamp means comprising a hollow cylindrical clamp being open at one side and integrally formed with a pair of parallelly spaced tightening flanges having aligned openings, said casing wall having an inwardly struck frusto-conical opening aligned with said openings, a tightening screw having a frusto-conical head received within said frusto-conical opening and passing through said aligned openings in said flanges.

3. Mounting means for an auto antenna thermometer according to claim 2, the innermost tightening flange having integrally formed at right angles thereto a flange adapted to abut one of the sides of said nut whereby to prevent the rotational movement of the same, said screw having a slotted head whereby to tighten the same from outside of said casing.

4. Mounting means for an auto antenna thermometer according to claim 3, said casing being of substantially hollow cylindrical shape and being integrally formed at one end with a hemispherical end wall whereby to reduce air resistance, the other end of said casing being open.

References Cited in the file of this patent
UNITED STATES PATENTS

| | | |
|---|---|---|
| 1,978,646 | Oishei et al. | Oct. 30, 1934 |
| 2,192,392 | Woodward | Mar. 5, 1940 |
| 2,252,579 | Rosen | Aug. 12, 1941 |
| 2,523,590 | Potter et al. | Sept. 26, 1950 |
| 2,608,655 | Riemann | Aug. 26, 1952 |
| 2,678,068 | Mohr | May 11, 1954 |